United States Patent [19]

Martin

[11] Patent Number: 4,766,720
[45] Date of Patent: Aug. 30, 1988

[54] PRESS WITH SELF ALIGNING TOOLING

[75] Inventor: Dean W. Martin, Peoria, Ill.

[73] Assignee: Caterpillar Inc., Peoria, Ill.

[21] Appl. No.: 101,528

[22] Filed: Sep. 28, 1987

[51] Int. Cl.$^4$ .................................................. B21L 9/06
[52] U.S. Cl. ................................................ 59/7; 59/11; 59/35.1
[58] Field of Search ............... 59/7, 11, 35.1, 1, 5, 59/8; 72/442, 447, 478; 74/110

[56] References Cited

U.S. PATENT DOCUMENTS

| | | | |
|---|---|---|---|
| 1,946,911 | 5/1931 | Lindberg et al. | 59/7 |
| 3,028,723 | 3/1958 | Kaplan et al. | 59/7 |
| 3,075,346 | 1/1963 | Quarve et al. | 59/7 |
| 3,099,130 | 7/1963 | Pahl | 59/11 |
| 3,939,648 | 2/1976 | Cullen | 59/11 |
| 4,027,471 | 6/1977 | Lipp et al. | 59/7 |
| 4,339,961 | 7/1982 | Grillot et al. | 59/7 |
| 4,531,355 | 7/1985 | Numakura | 59/11 |
| 4,612,765 | 9/1986 | Livesay | 59/7 |
| 4,621,491 | 11/1986 | Moriki et al. | 59/7 |

Primary Examiner—David Jones
Attorney, Agent, or Firm—Sterling R. Booth, Jr.

[57] ABSTRACT

Conventional apparatus for pressing the track links onto pin and bushings of the track chain during assembly thereof experience difficulty in aligning the links with the pin and bushings because the presses become somewhat loose and out of alignment. The subject apparatus overcomes this problem by providing a self aligning feature in the link locating and driving means. The link locating and driving member is mounted on the pressure plate that is attached to the press rams. A support plate is guided from the pressure plate by guides and resilient members that allow the support plate to shift with respect to the pressure plate with the aid of tapered noses on plungers supported by pressure barrels as the rams move forwardly to press the links onto the pin and bushings held in a fixture. In this manner any misalignment is accounted for by the self-aligning feature of the locating and driving members.

10 Claims, 4 Drawing Sheets

PRESS WITH SELF ALIGNING TOOLING

TECHNICAL FIELD

This invention relates to a track assembling press and more particularly to a self-aligning link locating and driving means which is mounted to the rams of the press.

BACKGROUND

The severe operating environment of earthmoving equipment and particularly crawler type tractors requires maximum quality in components if satisfactory service and life is to be realized. Specifically, the track chains which support, move and steer crawler type tractors and other earthmoving equipment encounter some of the highest loads and wear rates to which components of such equipment are exposed.

Such track chains must be made mechanically strong and heavy. However, they must also be flexible since they provide the means for moving the equipment in operation. Such basic incompatibility in function requires great care in fabrication, including careful attention to materials and close tolerances in dimensioning the parts in order to provide the necessary strength while preserving the equally necessary flexibility of the chain. Experience has proven that an articulated chain made of a plurality of link assemblies, each consisting of a pair of spaced interconnected links joined to each other and to another link assembly by concentrically disposed pin and bushing means will provide the necessary strength and flexibility. The links each include a pair of cylindrical bores, dimensioned to receive the pins and bushings respectively with a press fit of very close tolerance. Once assembled such chain is capable of providing long and dependable service in the operation of heavy earth moving equipment.

As is well known in the art, the assignee of this invention has for a number of years produced track chain known as sealed and lubricated track. This particular track includes seals between the bushings and the track links to maintain a quantity of lubricating fluid between the pin and the bushing to increase the life of the track chain assembly. This feature reduces the friction between these components thereby reducing fuel costs, making the machine more efficient, and reducing the amount of noise that is generally created by dry track chain joints.

However, assembly of such chain has presented a particular problem, the difficulty of aligning and pressing the parts of a link to assemble them with each other and with the pin and bushings. If the track press has become worn, which is the case of many presses being used in the field, the link bores are not properly aligned with the pin and bushing when they are being pressed thereon. When this happens the surface between the pin and the track link becomes scored and creates a leak path for the lubricant within the track chain. Loss of lubricant causes accelerated wear of the track joint resulting in the necessity of rebuilding the track chain.

It is a primary object of this invention to provide an apparatus for assembling track chain of the type described above, without causing the damage to the pin or link bore.

It is a further object of this invention to provide a self-aligning link locating and driving means for the track press to prevent the damaging of a misaligned pin and bushing to link bore.

DISCLOSURE OF THE INVENTION

In one aspect of the invention a self-aligning, link driving and locating means is adapted to cooperate with a track press to properly self align the track link bores with the pin and bushings as the track chain is being assembled. The self-alignment is provided by a support plate which is attached to a pressure plate by guide means including coiled compression springs wherein the guide means have heads considerably larger than their supporting stems. The heads are seated in matching seats in the support plate which contains pressure barrels that locate and drive the links into place on the pin and bushings located and held by a fixture mounted on the indexing means of the press.

Plungers with tapered noses mounted within the pressure barrels engage openings at the ends of the pins and the bushings causing the support plates to shift until the bores of the links supported thereby are centered with the pin and bushing before the link is forced onto the pin and bushing.

The foregoing and other aspects will become apparent from the following detailed description when considered in conjunction with the accompanying drawings. It is expressly understood, however, that the drawings are not intended as a definition of the invention but are for the purpose of illustration only.

BEST MODE FOR CARRYING OUT THE INVENTION

Figure 1:
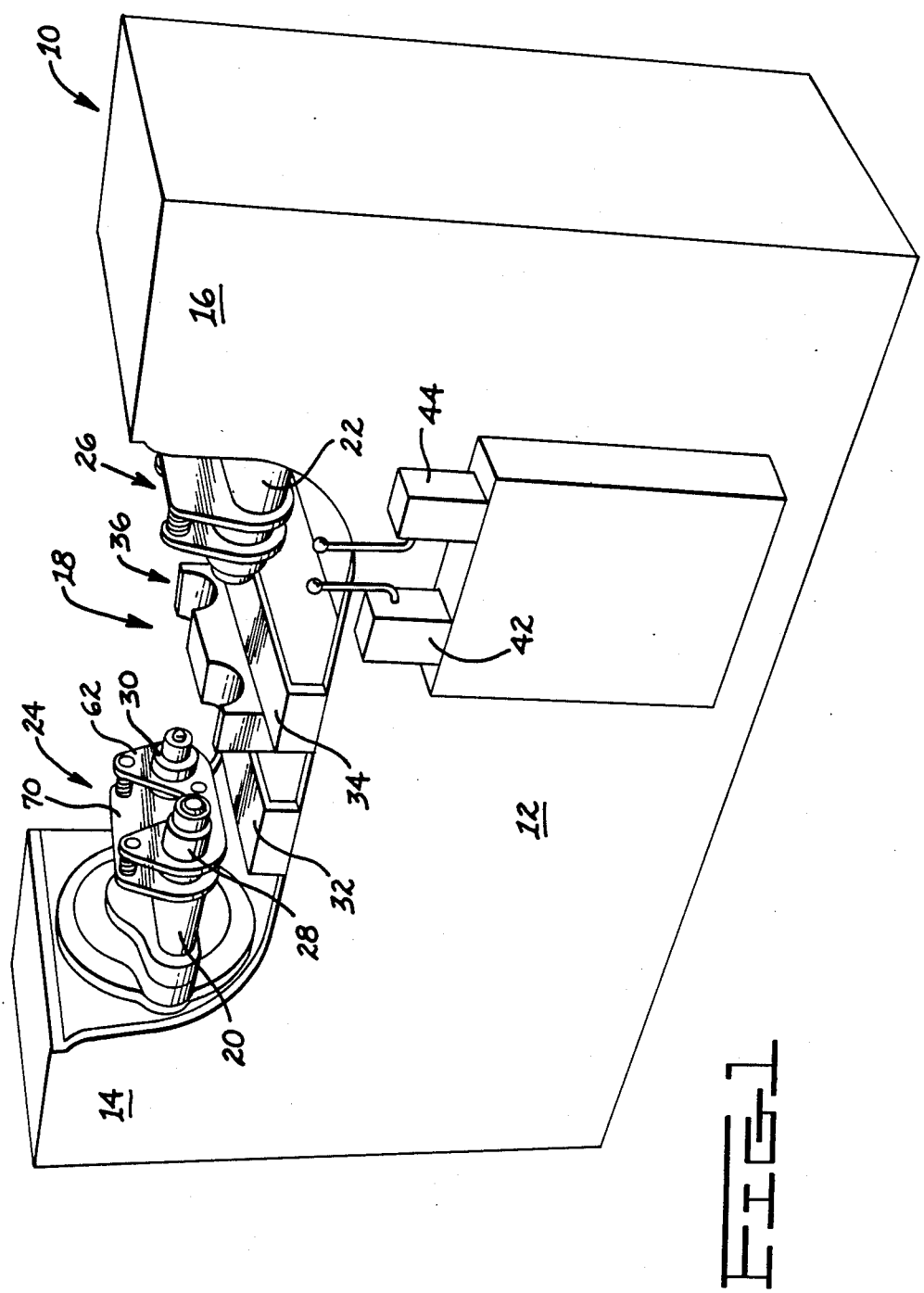
FIG. 1 is a perspective view of a multistation track press incorporating an embodiment of the present invention.

In FIG. 1 a track press, illustrated by the numeral 10, includes a horizontally extending bed or frame 12 and a pair of vertically extending supports 14, 16 which define a work station shown generally at 18. A pair of rams 20, 22 extend horizontally inwardly from the vertical supports 14, 16 and have multihead link locating and driving means 24, 26 releasably mounted thereto. Pressure barrels 28, 30 extend inwardly from the link driving and supporting means, the barrels 28, 30 being laterally spaced a distance equal to the joint spacing of the track chain being assembled.

Apparatus is provided for supporting and positioning the unassembled links and the coacting concentrically disposed pin and bushing assemblies, in a predetermined relationship with one another adjacent the link driving and locating means. Such apparatus is secured to the bed of the work station and may include, by way of example, elongated plates 32, 34 and fixture 36. The fixture has notches 38 and 40 for locating and holding the bushings of the link assembly. Suitable controls 42 and 44 are also provided for advancing and retracting the rams and for indexing the chain during the assembly process as is well known in the art.

Figure 2:
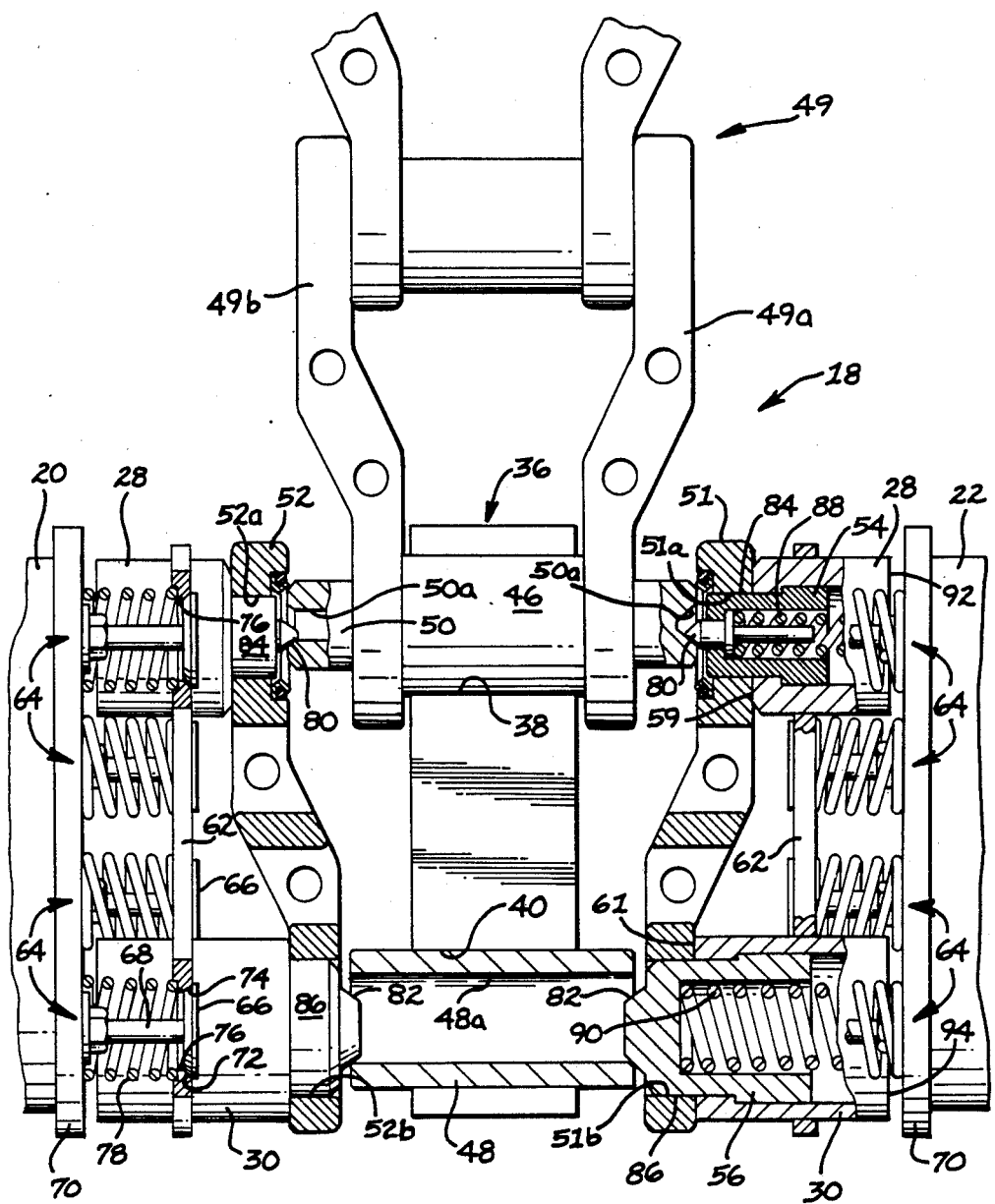
FIG. 2 is an enlarged top plan view partially in section of a work station of the track press shown in FIG. 1 with the links mounted on the plungers of pressure barrels and with the tapered noses making initial contact with a misaligned pin and bushing of a track chain assembly.

Referring now to FIG. 2, the work station 18 is shown from the top with bushings 46 and 48 located in the notches 38 and 40 of the fixture 36. The bushing 46 has previously been assembled into two links 49a, 49b that form a track link assembly 49. Extending through that bushing to become a part of the next track link assembly is a pin 50. Links 51 and 52 having bores 51a, 51b and 52a, 52b are shown resting on plungers 54 and 56 on each side of the fixture 36. Plungers 54 and 56 are reciprocally mounted within the respective pressure barrels 28 and 30.

Each pair of pressure barrels 28 and 30 are attached to a support plate 62 and have leading ends 59 and 61 that engage the side of the links. The barrels 28 and 30 extend through apertures in the support plate 62 and are attached thereto as by welding or other suitable means. The support plate 62 is mounted on and guided by multiple guide means 64.

Each guide means 64 has an enlarged head 66 substantially larger than a stem 68 extending therefrom and seated in matching seats in pressure plate 70 removably mounted on ram 20. The heads 66 resemble poppet valve heads and have tapered surfaces 72 that engage tapered surfaces 74 of apertures 76 in the support plate 62. Resilient means in the form of coiled compression springs 78 extending between the pressure plate 70 and support plate 62, urge the support plate against the heads 66 of the guide means 64.

Each plunger 54 has a tapered nose 80 that extends beyond an exposed surface 84. Similarly there is a tapered nose 82 that extends beyond an exposed surface 86 of plunger 56. The plungers 54 and 56 are urged to their extended position as shown in FIG. 2 by springs 88 and 90 that are sized accordingly.

INDUSTRIAL APPLICABILITY

The above described apparatus is used to assemble track chain and more particularly to press the links 51, 52 onto the pin 50 and bushing 48. The previously assembled link assembly has its bushing with pin 50 therein located in the notch 38 of the fixture 36. In operation a second bushing is located in the notch 40 of the fixture 36 and links 51 and 52 are positioned on the exposed surfaces 84 and 86 of the plungers 54 and 56.

Operation of the hydraulic controls 42, 44, controls power to advance the rams 20 and 22 toward each other carrying with them the attached link locating and driving means 24.

Figure 3:
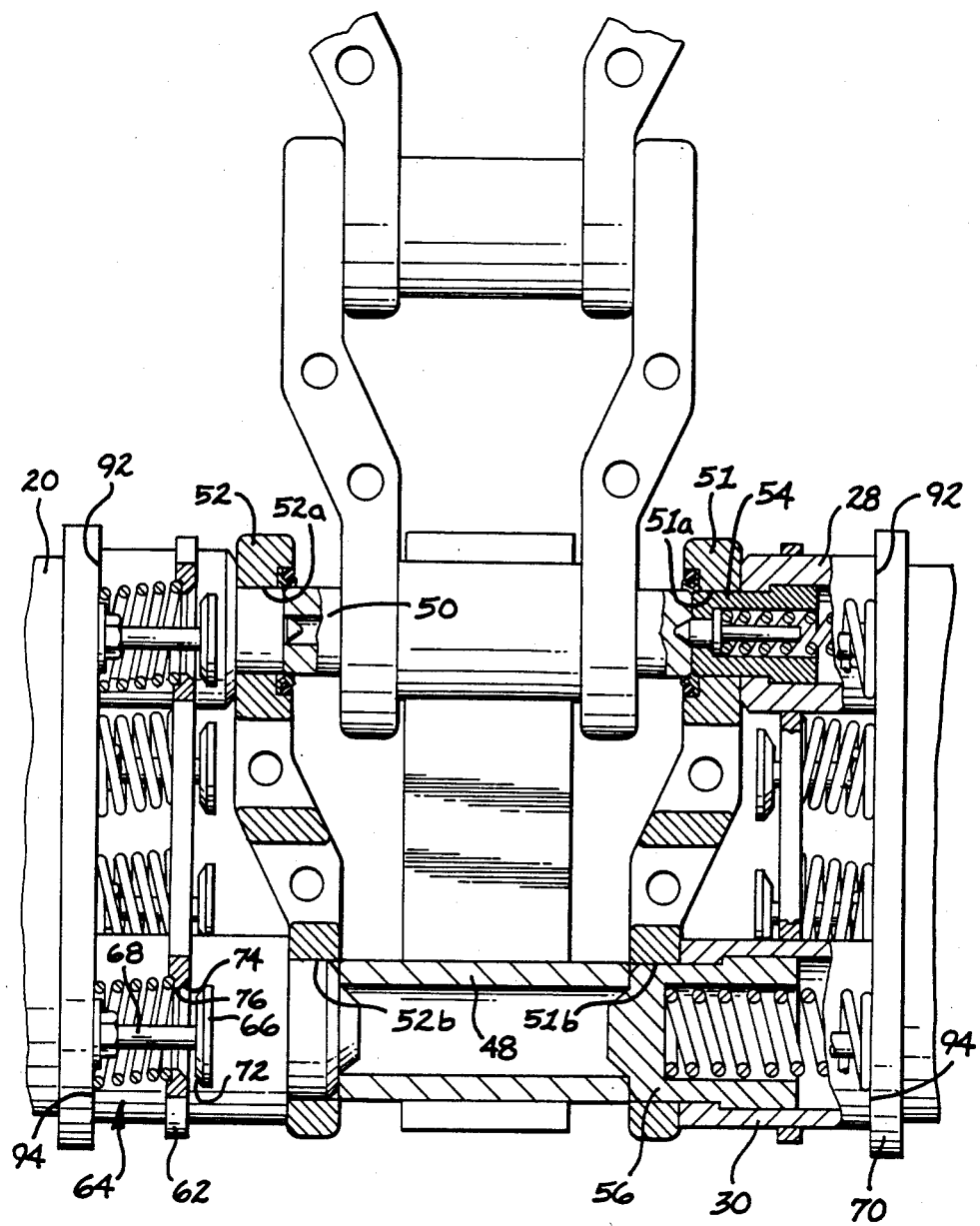
FIG. 3 is a view similar to FIG. 2, showing further progression of the press action with the support plate released from the head and matching surfaces of the guide means allowing it to shift so that the link bores are in alignment with the pin and bushing.

As the link locating and driving means approach the bushing 48 and pin 50, the tapered nose 80 and 82 of the plungers 54 and 56 engage openings 48a and 50a of the bushing 48 and pin 50 which, if there is any misalignment, causes the plungers 54 and 56 and pressure barrels 28 and 30 to be forced toward the pressure plate against the resistance of resilient means 78. As this takes place, the support plate 62 to which the pressure barrels are secured moves toward the pressure plate 70 with its tapered surfaces 74 of the apertures 76 becoming disengaged from the tapered surfaces 72 of the heads 66 of the guide means 64. This allows the link locating and driving means to shift as shown in FIG. 3 allowing the track link bores 51a, 51b and 52a, 52b to become properly aligned with the track pin and bushing.

As the rams advance further, the pressure barrels 28 and 30 engage the pressure plate 70 by means of trailing ends 92 and 94, becoming solidly supported by the pressure plate. In this condition the links are forced onto the bushing and the pin by the pressure barrels 58 and 60.

As the pressure barrels 28 and 30 force the link onto the bushing and pin, the plungers 54 and 56 retract into the pressure barrels against the outwardly urging force of springs 88 and 90.

Figure 4:
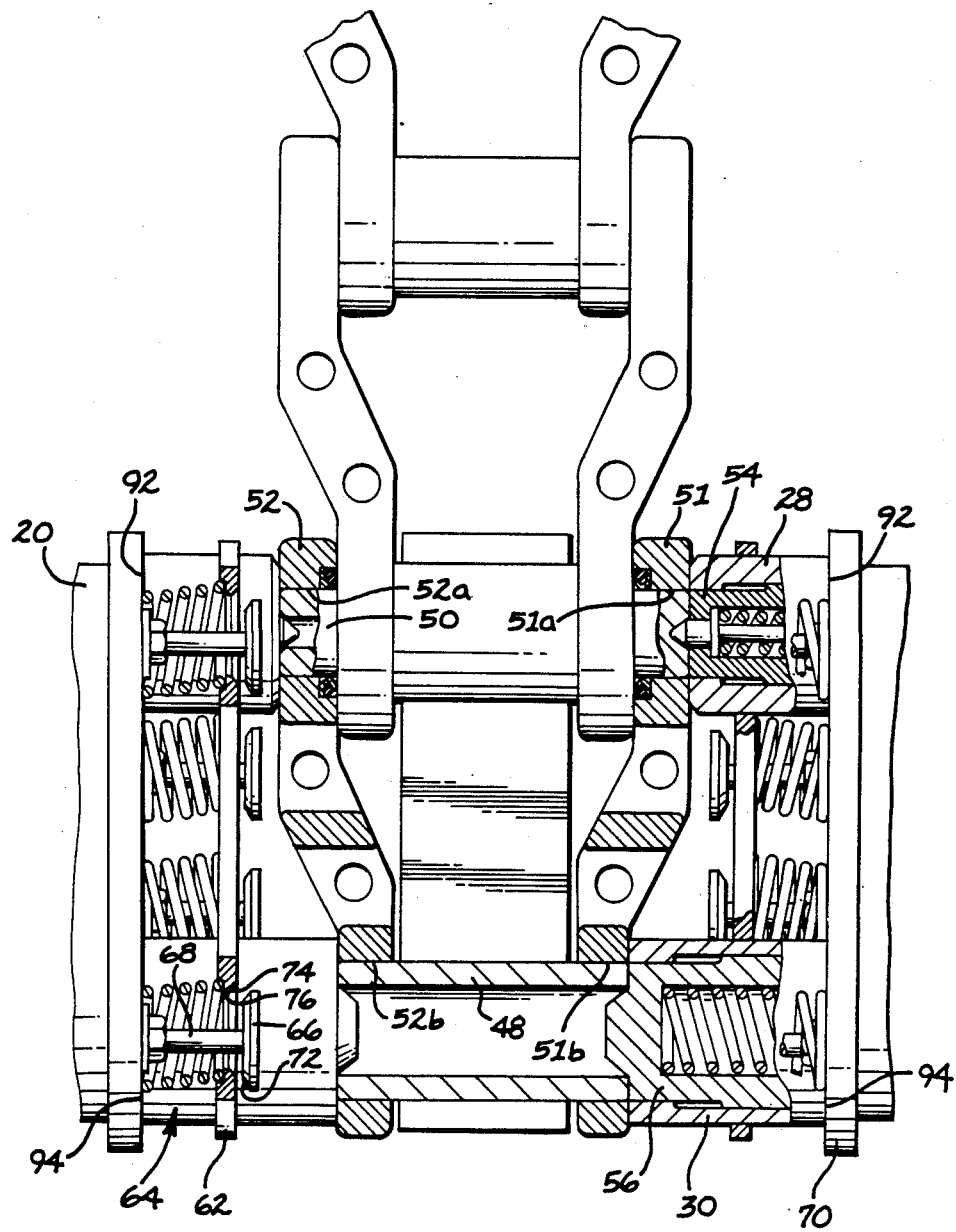
FIG. 4 is another view similar to FIG. 2, showing a still further progression wherein the track links have been fully pressed into their assembled position on the track assembly.

Since the combined force of the resilient means 78 of the guide means 64 is less than the force of the springs within the plungers 54 and 56, the plungers will maintain their outward position while forcing the support plate 62 inwardly against the force of the resilient means 78. This causes the plungers and pressure barrels with the links supported thereon to become properly aligned with the bushing and pin before the track link is pressed onto those members as shown in FIG. 4.

Other aspects, objects and advantages become apparent from study of the specification, drawings and appended claims.

I claim:

1. Apparatus for assembling a track chain of the type having a plurality of articulated link assemblies each comprising a pair of spaced, interconnected links having bores in each end and joined by a pin and a concentrically disposed bushing said apparatus comprising a press having a ram, a fixture for holding and locating the bushing during assembly, and link locating and driving means comprising:

a pressure plate mounted on the ram;

a support plate attached to the pressure plate by guide means, said guide means having enlarged heads seated in matching seats in the support plate;

resilient means extending between the pressure plate and the support plate to urge the support plate against the heads of the guide means, said guide means maintaining the support plate at a prescribed location spaced from the pressure plate;

a pressure barrel attached to the support plate and having a trailing end adjacent and spaced from the pressure plate and an opposite end facing the pin and bushing in the fixture;

a spring loaded plunger in the opposite end of the pressure barrel and extending therefrom with an exposed surface for engaging the bores of the link, and said plunger having a tapered nose extending outwardly of the link toward the pin and bushing; and wherein the spring loaded plunger has a higher compressive force than a combined compressive force of the resilient means thereby allowing the support plate to move away from the pin and bushing as the tapered noses engage openings in the pin and bushing causing the pressure barrels and the bores of the link to self-align with the pin and bushing.

2. The apparatus, as set forth in claim 1, wherein there are at least two rams opposing each other on either side of the fixture.

3. The apparatus, as set forth in claim 2, wherein a link locating and driving means is mounted on each ram for assembling two opposing links onto the pin and bushing at the same time.

4. The apparatus, as set forth in claim 1, wherein there are two pressure barrels attached to the pressure plate, spaced apart a distance equal to the distance between two bores in the link.

5. The apparatus, as set forth in claim 1, wherein the heads of the guide means have tapered edges that match tapered surfaces of the seats in the support plate.

6. The apparatus, as set forth in claim 1, wherein the guide means have stems extending from the heads and attached to the pressure plate, said stems being substantially smaller than the heads and their matching seats.

7. The apparatus, as set forth in claim 1, wherein the trailing end of the pressure barrel adjacent the pressure plate is spaced therefrom a distance greater than a distance required for the head of the guide means to clear its matching seat in the support plate.

8. The apparatus, as set forth in claim 1, wherein their are at least two guide means.

9. The apparatus, as set forth in claim 6 wherein the resilient means is comprised of coiled compression springs surrounding the stems of the guides.

10. The apparatus, as set forth in claim 7, wherein the trailing end of the pressure barrel adjacent the pressure plate engages the pressure plate upon further movement of the ram toward the fixture to transfer the high force of the ram through the barrel to force the link onto the pin and bushing after the link bores are properly aligned with the pin and bushing.

* * * * *